US008801260B2

(12) United States Patent
Urano et al.

(10) Patent No.: US 8,801,260 B2
(45) Date of Patent: Aug. 12, 2014

(54) DISPLAY DEVICE, ELECTRONIC APPARATUS AND LIGHTING DEVICE (75) Inventors: Nobutaka Urano, Chino (JP); Yoichi Momose, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 108 days.

(21) Appl. No.: 13/543,013

(22) Filed: Jul. 6, 2012

(65) Prior Publication Data

US 2013/0016523 A1 Jan. 17, 2013

(30) Foreign Application Priority Data

Jul. 11, 2011 (JP) ................................. 2011-152738
Dec. 1, 2011 (JP) ................................. 2011-263437
Dec. 1, 2011 (JP) ................................. 2011-263438

(51) Int. Cl.
G02B 6/00 (2006.01)

(52) U.S. Cl.
CPC .................................. *G02B 6/0073* (2013.01)
USPC ......................................... 362/612; 362/613

(58) Field of Classification Search
USPC ............................ 362/249.02, 611, 612, 613
See application file for complete search history.

(56) References Cited

U.S. PATENT DOCUMENTS

| 7,566,147 | B2 * | 7/2009 | Wilcox et al. | 362/249.02 |
| 7,798,701 | B2 * | 9/2010 | Mori et al. | 362/634 |
| 2008/0180972 | A1 * | 7/2008 | Sakamoto et al. | 362/613 |
| 2008/0186425 | A1 * | 8/2008 | Chang et al. | 349/58 |
| 2010/0157593 | A1 * | 6/2010 | Zhou et al. | 362/235 |
| 2011/0037920 | A1 | 2/2011 | Kim et al. | |

FOREIGN PATENT DOCUMENTS

| JP | A-2009-003081 | 1/2009 |
| JP | A-2011-040388 | 2/2011 |

\* cited by examiner

*Primary Examiner* — Laura Tso
(74) *Attorney, Agent, or Firm* — Oliff PLC (57) ABSTRACT In a lighting device of a display device, a plurality of light emitting elements are mounted on a surface of a light source substrate, and the light source substrate is supported by a light source support member by means of a positioning (fixing) structure such as a metal screw. The plurality of light emitting elements are divided into a plurality of blocks, and the emission light amount can be controlled with respect to each of the blocks. Although the head of the screw is exposed on the surface of the light source substrate, the screw is located between adjacent ones of the blocks. Therefore, even though the illuminating light intensity becomes partially discontinuous owing to the presence of the screw, degradation of display quality originating from such discontinuity can be suppressed.

20 Claims, 8 Drawing Sheets

DISPLAY DEVICE, ELECTRONIC APPARATUS AND LIGHTING DEVICE

BACKGROUND

1. Technical Field

The present invention relates to a display device that includes a lighting device and a display panel, an electronic apparatus that includes the display device, and the lighting device.

2. Related Art

A liquid crystal device, which is an example of existing display devices, includes a lighting device called a backlight device and a transmissive or semi-transmissive display panel (liquid crystal panel) disposed to overlap a light-emitting surface of the lighting device. The lighting device includes a light guide plate and a plurality of light emitting elements aligned so as to oppose one of the sides of the light guide plate that serves as a light-receiving surface, for example as disclosed in JP-A-2009-3081.

Figure 10A:
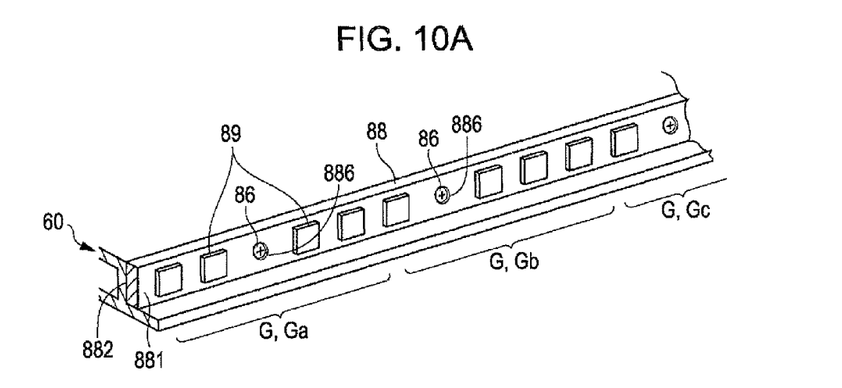
FIGS. 10A and 10B are a perspective view and a plan view respectively, showing an existing lighting device.
Figure 10B:
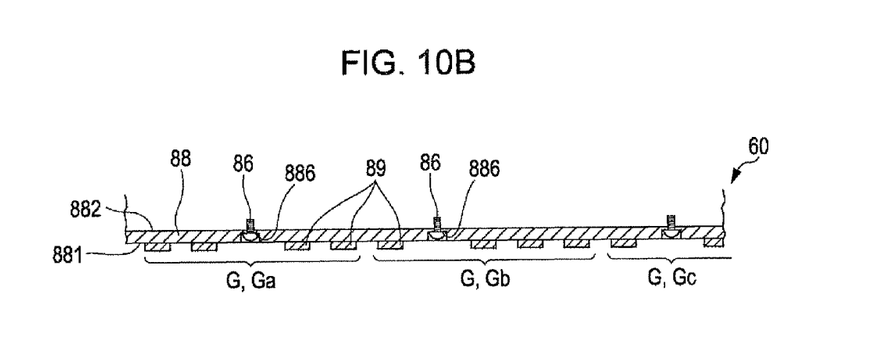

In many of the thus-configured lighting devices, for example as shown in FIGS. 10A and 10B, light emitting elements 89 are mounted on a surface 881 of a light source substrate 88, and the light source substrate 88 is fixed with screws 86 to a light source support member 60 made of a metal. Although the screws 86 are fastened from the side of the light source support member 60 according to JP-A-2009-3081, actually it is often inevitable to fasten the screws 86 from the side of the surface 881 of the light source substrate 88, owing to spatial restriction of the peripheral structure and for the sake of working efficiency.

Another example of the techniques thus far proposed is dividing the plurality of light emitting elements 89 into groups and controlling light intensity with respect to each of the groups, to thereby control the intensity of the illuminating light from the lighting device for each region. Such technique is called local dimming, and provides improved image contrast and moving picture display performance.

However, in the case where the screws 86 are fastened from the side of the surface 881 of the light source substrate 88 as shown in FIGS. 10A and 10E, the position where each screw 86 is located assumes different surface conditions from those of the adjacent regions in the longitudinal direction of the light source substrate 88. This leads to a drawback in that the luminance of the illuminating light becomes uneven, resulting in remarkable degradation of image quality. Especially in the case where the light emitting elements 89 are grouped in a plurality of groups G (group Ga, Gb, Gc, . . . ) in the longitudinal direction of the light source substrate 88 and the light intensity is controlled with respect to each of the groups G, the position in each group G where the screw 86 is located assumes different surface conditions (structural shape, projection and recess, step, surface roughness, color, texture, and so forth) from those of the adjacent regions. Accordingly, diffusion and reflection of the light become discontinuous and/or uneven and hence the light introduced through the light-receiving surface of the light guide plate is unevenly distributed. Consequently, uniform luminance expected from a flat-surface (plate-shaped) lighting device is unable to be achieved, and the image quality is remarkably degraded.

Such a drawback similarly arises even though, for example, a recess 886 is formed at the position where the screw 86 is located so that the screw head is kept from protruding from the surface 881 of the light source substrate 88. In addition, even though a hook is employed in place of the screw 86 so as to retain the light source substrate 88, or a recess is formed on the light source substrate 88 so that a projection formed on the light source support member 60 is fitted therein, the foregoing drawback is unable to be solved, as long as a positioning structure such as the hook or the projection is exposed on the surface 881 of the light source substrate 88.

SUMMARY

Accordingly, an advantage of some aspects of the invention is provision of a display device that suppresses degradation of display quality originating from a structure for positioning a light source substrate having a plurality of light emitting elements mounted on a side thereof, despite the positioning structure being exposed on the same side of the light source substrate, an electronic apparatus incorporated with the display device, and a lighting device.

In an aspect, the invention provides a display device including a lighting device and a display panel disposed to overlap a light-emitting surface of the lighting device. The lighting device includes a light guide plate disposed to overlap the display panel, a plurality of light emitting elements aligned along a first side of the light guide plate in a direction from an end portion toward the other end portion thereof, with a light-emitting surface of each of the plurality of light emitting elements arranged so as to oppose the first side, the first side serving as a light-receiving surface and the light emitting elements being divided into a plurality of blocks in the direction from the end portion toward the other end portion of the first side, a light source driver that controls, in accordance with a mode in which the display panel is driven, an amount of light to be emitted from each of the blocks, a light source substrate having the plurality of light emitting elements mounted on a first surface thereof, a light source support member attached to a second surface of the light source substrate, and a positioning structure located between adjacent ones of the plurality of blocks so as to place the light source substrate in position on the light source support member, with at least a part of the positioning structure exposed on the first surface of the light source substrate.

In the lighting device of the thus-configured display device, the plurality of light emitting elements are mounted on the first surface of the light source substrate, and the light source substrate is supported by the light source support member provided on the second surface thereof, by means of the positioning structure. The plurality of light emitting elements are divided into the plurality of blocks, and the light source driver adjusts the amount of light to be emitted from each block in accordance with the mode in which the display panel is driven, so as to control the intensity of the illuminating light from the lighting device with respect to each region. Here, the conditions of a portion of the first surface of the light source substrate where the positioning structure is located are different from those of the remaining portions since at least a part of the positioning structure is exposed on the first surface of the light source substrate. However, since the positioning structure is located between the adjacent blocks, although the intensity of the illuminating light becomes partially discontinuous owing to the presence of the positioning structure, such a discontinuous portion is barely noticeable because the discontinuous portion is located between the regions with respect to which the illuminating light intensity is respectively controlled. Accordingly, even though the illuminating light intensity becomes partially discontinuous owing to the presence of the positioning structure, degradation of display quality originating from such discontinuity can be suppressed.

In the foregoing display device, the positioning structure may be a screw fastened from the side of the first surface of the light source substrate. Such a configuration allows the light source substrate not only to be positioned, but also to be fixed.

Preferably, the light emitting elements may be aligned at regular intervals in the direction from the end portion toward the other end portion of the first side, in each of the blocks. Such a configuration allows the illuminating light from the light emitting elements of the same block to secure uniform light intensity distribution.

Preferably, the plurality of light emitting elements may be aligned at regular intervals in the direction from the end portion toward the other end portion of the first side.

Alternatively, intervals between the light emitting elements of the same block may be different from an interval between adjacent light emitting elements respectively belonging to one of adjacent ones of the plurality of blocks.

Preferably, the light source substrate may be integrally formed so as to extend in the direction from the end portion toward the other end portion of the first side. Such a configuration facilitates the assembly of the lighting device. Alternatively, the light source substrate may be divided at a position between adjacent ones of the plurality of blocks.

The foregoing display device is suitably applicable, for example, to electronic apparatuses such as a liquid crystal TV.

In another aspect, the invention provides a lighting device including a light guide plate, a plurality of light emitting elements aligned along a first side of the light guide plate in a direction from an end portion toward the other end portion thereof, with a light-emitting surface of each of the plurality of light emitting elements arranged so as to oppose the first side, the first side serving as a light-receiving surface and the light emitting elements being divided into a plurality of blocks in the direction from the end portion toward the other end portion of the first side, a light source driver that controls an amount of light to be emitted from each of the blocks, a light source substrate having the plurality of light emitting elements mounted on a first surface thereof, a light source support member attached to a second surface of the light source substrate, and a positioning structure located between adjacent ones of the plurality of blocks so as to place the light source substrate in position on the light source support member, with at least a part of the positioning structure exposed on the first surface of the light source substrate.

In the thus-configured lighting device, the plurality of light emitting elements are mounted on the first surface of the light source substrate, and the light source substrate is supported by the light source support member provided on the second surface thereof, by means of the positioning structure. The plurality of light emitting elements are divided into the plurality of blocks, and the light source driver adjusts the amount of light to be emitted from each block so as to control the intensity of the illuminating light from the lighting device with respect to each region. Here, the conditions of a portion of the first surface of the light source substrate where the positioning structure is located are different from those of the remaining portions since at least a part of the positioning structure is exposed on the first surface of the light source substrate. However, since the positioning structure is located between the adjacent blocks, although the intensity of the illuminating light becomes partially discontinuous owing to the presence of the positioning structure, such a discontinuous portion is barely noticeable because the discontinuous portion is located between the regions with respect to which the illuminating light intensity is respectively controlled.

BRIEF DESCRIPTION OF THE DRAWINGS

The invention will be described with reference to the accompanying drawings, wherein like numbers reference like elements.

DESCRIPTION OF EXEMPLARY EMBODIMENTS

Referring to the drawings, embodiments of the invention will be described, in which a display device for a liquid crystal TV is taken up as an example. In the drawings referred to here below, different scales are employed for layers and constituents for the sake of clearer visual recognition. In addition, the same constituents as those of FIGS. 10A and 10B will be given the same numeral in the remaining drawings, for better understanding of the correspondence therebetween. In the following description, further, one of directions intersecting with each other in the plane of a light guide plate or a liquid crystal panel, in which the long sides of the light guide plate and the liquid crystal panel extend, will be referred to as X-axis direction; the other direction in which the short sides of the light guide plate and the liquid crystal panel extend will be referred to as Y-axis direction; and a direction intersecting with both the X-axis direction and the Y-axis direction (thickness direction, i.e., the direction in which the light guide plate and the liquid crystal panel are disposed to overlap) will be referred to as Z-axis direction. One side of the X-axis direction will be referred to as X1-side and the other side thereof will be referred to as X2-side. Likewise, one side of the Y-axis direction (where the bulging portion of the liquid crystal panel is located) will be referred to as Y1-side; the other side opposite to the Y1-side will be referred to as Y2-side; one side of the Z-axis direction (rear side of the light guide plate) will be referred to as Z1-side (lower side); and the other side (where illuminating light and display light are emitted) will be referred to as Z2-side (upper side).

First Embodiment

General Configuration

Figure 1A:
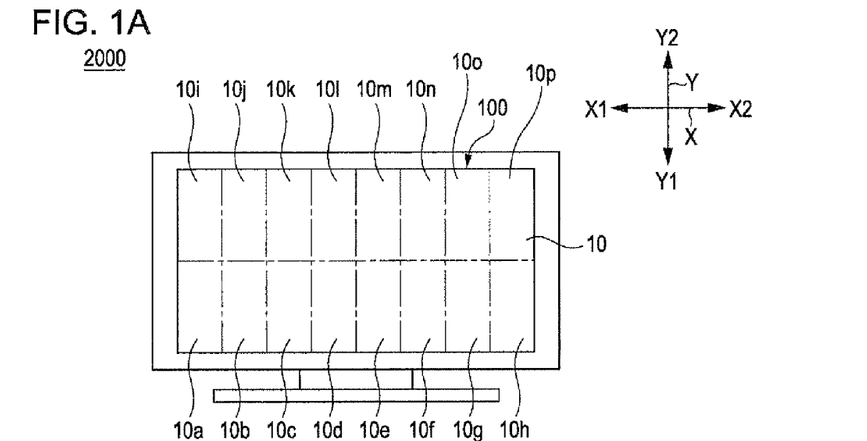
FIG. 1A is a schematic front view of a liquid crystal TV, exemplifying the electronic apparatus of the invention, including a display device according to a first embodiment of the invention.
Figure 1B:
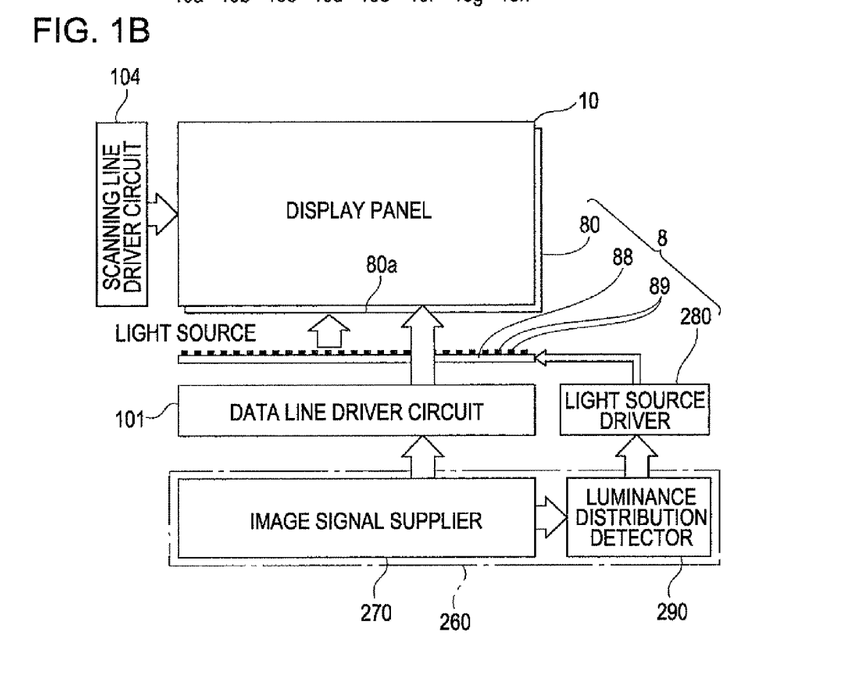
FIG. 1B is a block diagram of the display device.

FIG. 1A is a schematic front view of a liquid crystal TV, exemplifying the electronic apparatus of the invention, including a display device according to a first embodiment, and FIG. 1B is a block diagram showing an electrical configuration of the display device.

The electronic apparatus 2000 shown in FIG. 1A is a liquid crystal TV, and the display device 100 incorporated in the liquid crystal TV includes a transmissive display panel 10. As shown in FIG. 1B, the display device 100 includes, in addition to the display panel 10 to be subsequently described referring to FIG. 2A and other related drawings, an image signal supplier 270 that supplies image signals to the display panel 10 from outside through a flexible interconnect substrate, and a lighting device 8 disposed to overlap the rear face of the display panel 10 so as to supply illuminating light. The display device 100 includes a scanning line driver circuit 104 that drives scanning lines extending in the display panel 10 in the X-axis direction and a data line driver circuit 101 that drives data lines extending in the display panel 10 in the Y-axis direction. Both the scanning line driver circuit 104 and the data line driver circuit 101 may be mounted inside the display panel 10. Alternatively, one of the scanning line driver circuit 104 and the data line driver circuit 101 may be mounted inside the display panel 10 and the other may be incorporated in a driver IC COG-mounted on the display panel 10, or in a driver IC mounted on a circuit board 250 electrically connected to the display panel 10. Further, both of the scanning line driver circuit 104 and the data line driver circuit 101 may be incorporated in a driver IC provided as a separate component for the display panel 10.

In this embodiment, a lighting device 8 includes a light guide plate 80 disposed to overlap the display panel 10, a plurality of light emitting elements 89 aligned along one of the sides of the light guide plate 80 that serves as a light-receiving surface 80a, and a light source substrate 88 on which the plurality of light emitting elements 89 are mounted. The respective light-emitting surfaces of the light emitting elements 89 are arranged so as to oppose the light-receiving surface 80a of the light guide plate 80.

With the thus-configured display device 100, image contrast and moving picture display performance can be improved, by controlling the intensity of illuminating light from the lighting device 8 in accordance with a mode in which the display panel 10 is driven. For example, brightness of images displayed in each of regions 10a to 10p of the display panel 10 is detected, and the lighting device 8 controls the illuminating light intensity depending on the level of the brightness, such as emitting the illuminating light with greater emission intensity (illuminating light having high luminance) to a region where a brighter image is displayed, and emitting the illuminating light with lower emission intensity (illuminating light having low luminance) to a region where a darker image is displayed. Such a method, known as local dimming, allows the image contrast and moving picture display performance to be improved, and contributes to reducing power consumption.

In the display device 100 according to this embodiment, therefore, the plurality of light emitting elements 89 are divided into a plurality of blocks each corresponding to one of the regions 10a to 10p of the display panel 10, as will be subsequently described. The display device 100 also includes a luminance distribution detector 290 that detects the brightness of the image of the respective regions 10a to 10h of the display panel 10, and a light source driver 280 that controls the intensity of the light from the light emitting elements 89 with respect to each block, on the basis of the detection result provided by the luminance distribution detector 290, and the light source driver 280 supplies the same driving current to the light emitting element 89 belonging to the same block. The luminance distribution detector 290 may be included, for example, in an IC 260 that includes the image signal supplier 270.

Specific Configuration of Display Device 100

Figure 2A:
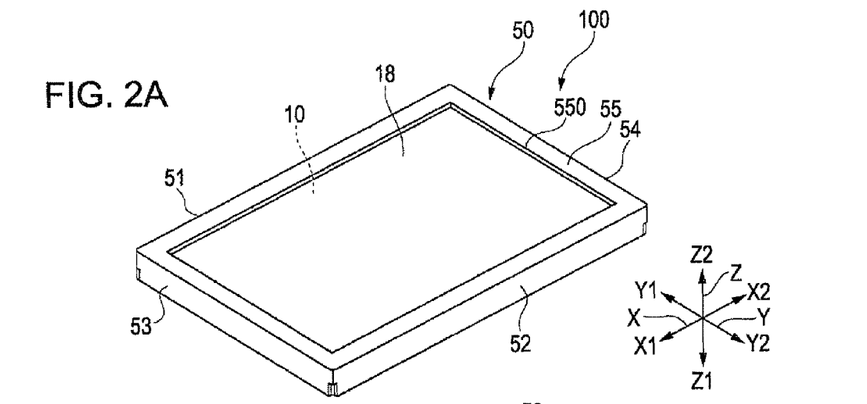
FIGS. 2A and 2B are a perspective view and an exploded perspective view respectively, showing the display device according to the first embodiment.
Figure 2B:
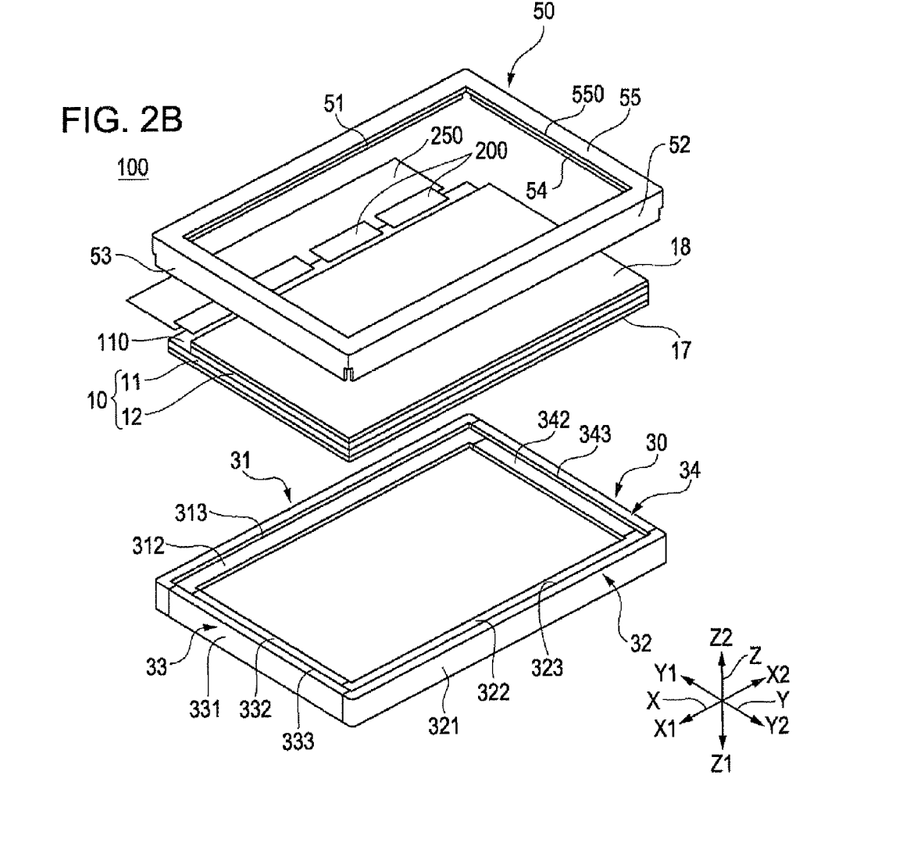
Figure 3:
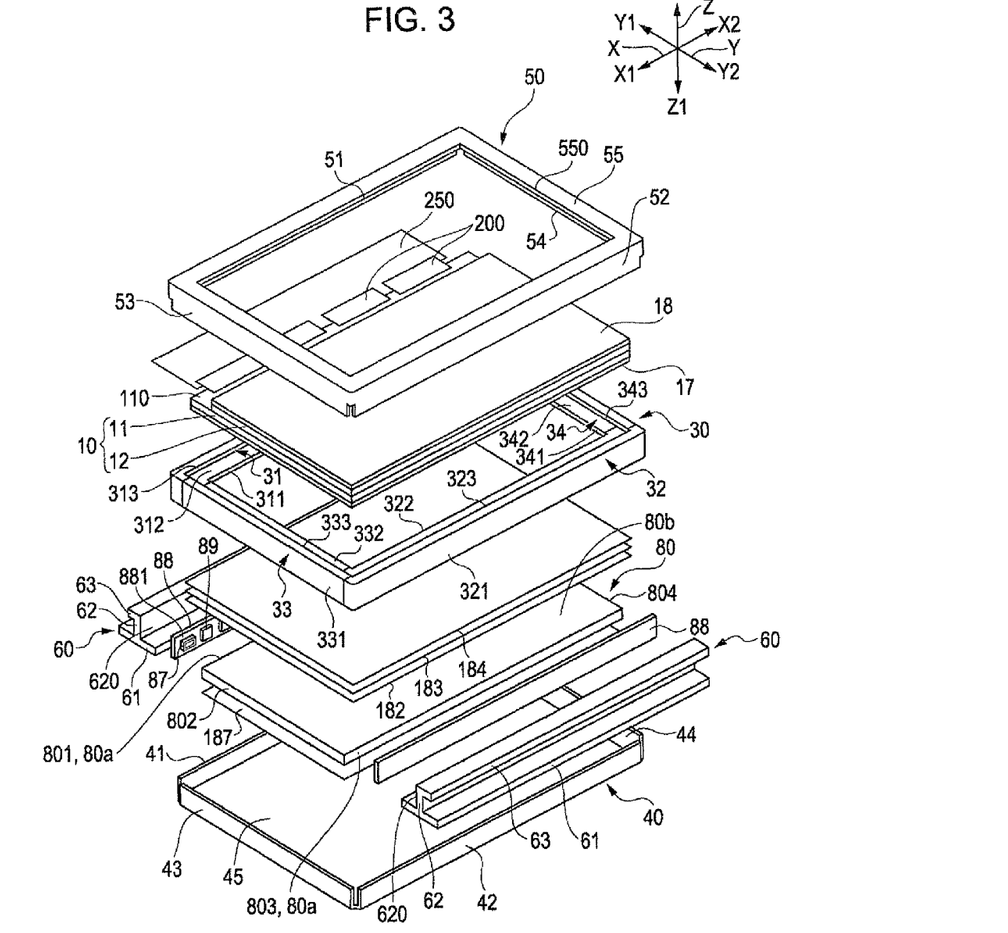
FIG. 3 is an exploded perspective view of the display device according to the first embodiment, showing further details.
Figure 4:
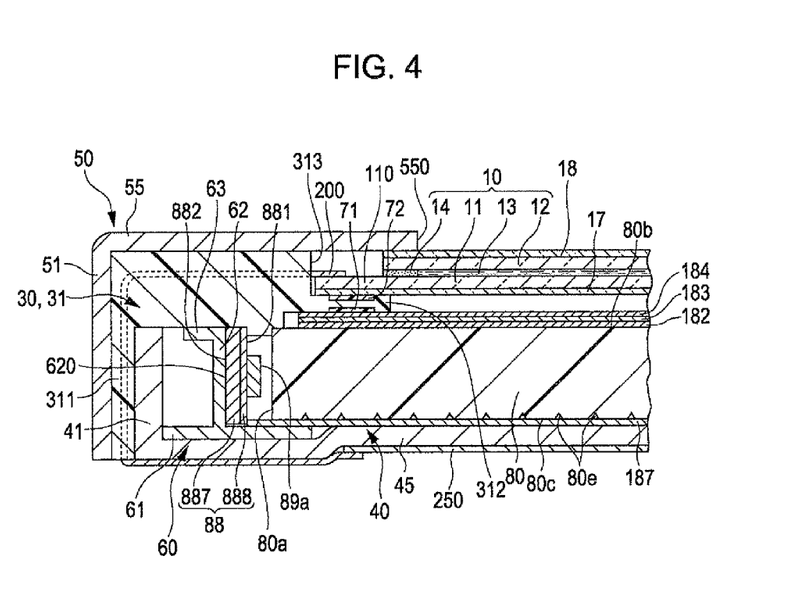
FIG. 4 is a cross-sectional view showing an essential portion of the display device according to the first embodiment.

FIGS. 2A and 2B are a perspective view and an exploded perspective view respectively, showing a general configuration of the display device 100 according to the first embodiment. FIG. 3 is an exploded perspective view of the display device 100, showing further details thereof. FIG. 4 is a cross-sectional view showing an essential portion of the display device 100.

Referring to FIGS. 2A to 4, the display device 100 according to this embodiment includes the lighting device 8, generally called a backlight device, and a transmissive liquid crystal panel disposed to overlap the lighting device 8 and constituting the display panel 10. The display device 100 also includes a frame 30 made of a resin that retains therein the display panel 10 and the lighting device 8, a box-shaped lower frame 40 made of a metal located under the resin frame 30 (Z1-side in the Z-axis direction, i.e., opposite the displaying surface), and a frame-shaped upper frame 50 made of a metal located over the resin frame 30 (Z2-side in the Z-axis direction, i.e., on the side of the displaying surface).

The resin frame 30 is of a rectangular frame shape that surrounds the display panel 10, and supports the outer peripheral edge of the display panel 10 so as to set the display panel 10 in position. In this embodiment, the resin frame 30 is composed of four frame plates 31 to 34 each constituting one of the four sides of the display panel 10. The resin frame 30 is formed in a black color so as to serve as a light-absorber that suppresses emergence of stray light in the lighting device 8. The frame plates 31 to 34 respectively include a lateral plate 311, 321, 331, 341 extending downward (thickness/height direction) from an outer edge of each frame plate 31 to 34, and a protruding plate 312, 322, 332, 342 bulging inward from halfway of the inner surface of the frame plate 31 to 34 in the height direction. Accordingly, stepped portions 313, 323, 333, 343 are formed inside the frame plate 31 to 34 because of the protruding plates 312, 322, 332, 342, so that the display panel 10 is retained by the protruding plates 312, 322, 332, 342 and positioned by the stepped portions 313, 323, 333, 343 serving as abutments. In addition, the light guide plate 80 and the light emitting elements 89 of the lighting device 8 are located under the protruding plate 312.

The lower frame 40 may be formed by pressing a thin metal plate such as a stainless steel plate. The lower frame 40 includes a bottom plate 45 and four lateral plates 41 to 44 erected from the peripheral edge of the bottom plate 45, so as to form a rectangular box shape having an opening on the upper side. The lateral plates 311 to 341 of the resin frame 30 are located so as to cover the outer surface of the lateral plates 41 to 44 of the lower frame 40.

The upper frame 50 may also be formed by pressing a thin metal plate such as a stainless steel plate, like the lower frame 40. The upper frame 50 includes a flat and frame-shaped top plate 55 and four lateral plates 51 to 54 bent downward (thickness direction of the display device) from the peripheral edge of the top plate 55. The opening of the top plate (upper side) is formed so as to correspond to the display regions (10a to 10p) of the display panel 10, while the opening on the lower side of the upper frame 50 is larger because of the lateral plates. The lateral plates 51 to 54 are located so as to cover the outer surface of the lateral plates 311, 321, 331, 341 of the resin frame 30. The top plate 55 includes a rectangular opening 550 through which the light from the display panel 10 is emitted, and is formed so as to cover the entire periphery of the display light emitting surface of the display panel 10.

The upper frame 50, the resin frame 30, and the lower frame 40 configured as above are joined with bolts or the like (not shown), so as to retain therein the display panel 10 and the lighting device 8. Here, flexible sheets 71, 72 having a greater friction coefficient than the resin frame 30 are respectively attached to the lower and upper surface of the protruding plates 312, 322, 332, 342 of the resin frame 30. Accordingly, upon assembling the display device 100 the display panel 10 is supported by the protruding plates 312, 322, 332, 342 via the flexible sheet 72 so as not to make a positional shift. Likewise, upon assembling the display device 100, optical sheets (diffusion sheet 182, pair of prism sheets 183, 184) of the lighting device 8 are supported via the flexible sheet 71 in contact therewith, and fixed so as not to make a positional shift.

Configuration of Display Panel 10

As shown in FIGS. 2A to 4, the display panel 10 has a flat rectangular shape and includes an element substrate 11 on which pixel electrodes (not shown) are provided, a counter substrate 12 located so as to oppose the element substrate 11 with a predetermined gap therebetween, and a seal member 14 combining the counter substrate 12 and the element substrate 11. In the thus-configured display panel 10, a liquid crystal layer 13 is provided in a region surrounded by the seal member 14. The element substrate 11 and the counter substrate 12 are formed of a transmissive material such as a glass substrate. On the element substrate 11, a plurality of scanning lines (not shown) are arranged so as to extend in the X-axis direction and a plurality of data lines (not shown) are arranged so as to extend in the Y-axis direction, and switching elements (not shown) and pixel electrodes are provided so as to each correspond to an intersection of the scanning line and the data line.

In this embodiment, the counter substrate 12 is located on the side of the display light emitting surface, and the element substrate 11 is located on the side of the lighting device 8. The counter substrate 12 includes a frame layer (not shown) formed of a light-shielding layer, provided on the surface opposing the element substrate 11 and along the inner edge of the seal member 14. The display panel 10 may be constituted of a liquid crystal panel of a twisted nematic (TN) type, an electrically controlled birefringence (ECB) type, or a vertical aligned nematic (VAN) type, and the pixel electrodes are provided on the element substrate 11 and a common electrode (not shown) is provided on the counter substrate 12. However, in the case where the display panel 10 is of an in-plane switching (IPS) type or a fringe field switching (FFS) type, the common electrode is provided on the element substrate 11. Conversely, the element substrate 11 may be located on the side of the display light emitting surface with respect to the counter substrate 12. An upper polarizing plate 18 is stacked on the upper surface of the display panel 10, and a lower polarizing plate 17 is interposed between the lower face of the display panel 10 and the lighting device 8.

In this embodiment, the element substrate 11 is larger than the counter substrate 12. Accordingly, the element substrate 11 includes a bulging portion 110 protruding from an edge of the counter substrate 12 in the Y-axis direction, and a flexible interconnect substrate 200 is connected to the upper face of the bulging portion 110. The flexible interconnect substrate 200 is composed of a plurality of sheets of flexible interconnect substrates combined together, each of which is connected to a circuit board 250 (printed circuit board). Thus, the control IC 260 constituting the image signal supplier 270 and the light source driver IC (not shown) constituting the light source driver 280, described earlier referring to FIG. 1B, are mounted on the circuit board 250 or the flexible interconnect substrate 200. The control IC constituting the image signal supplier 270 may be COG-mounted on the upper face of the bulging portion 110 of the display panel 10.

Configuration of Lighting Device 8

Figure 5A:
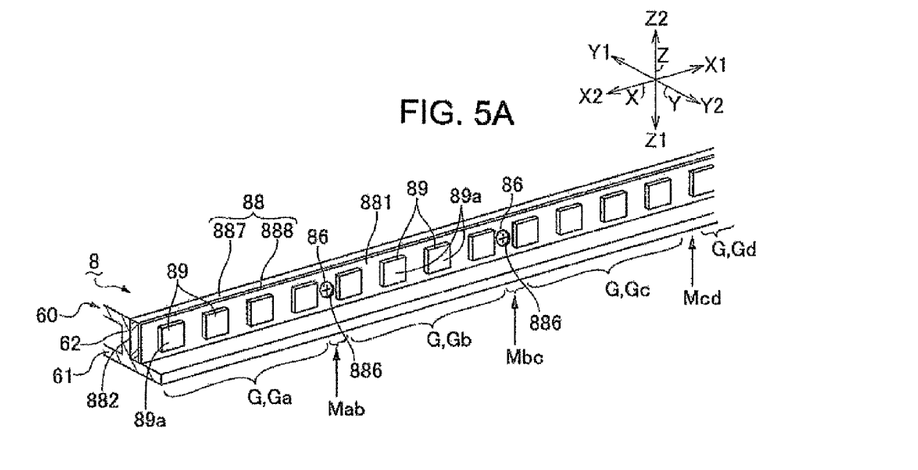
FIG. 5A is a perspective view and FIGS. 5B and 5C are plan views, showing a configuration of light emitting elements and a light source substrate employed in a lighting device of the display device according to the first embodiment.
Figure 5B:
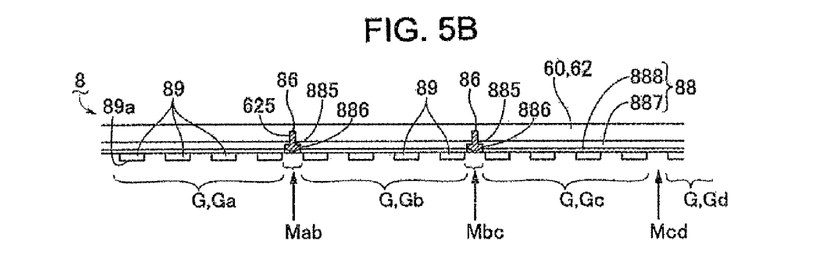
Figure 5C:
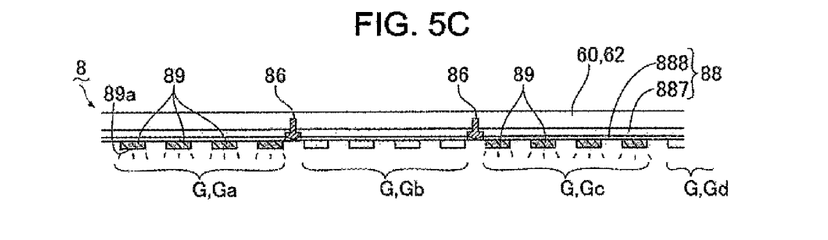

FIGS. 5A to 5C illustrate the light emitting elements 89 and the light source substrate employed in the lighting device 8 of the display device 100 according to the first embodiment, FIG. 5A being a perspective view of the light emitting elements 89 viewed from the side of the first surface of the light source substrate 88 on which the light emitting elements 89 are mounted, FIG. 5B being a plan view of the light emitting element 89 in a direction orthogonal (direction of short sides, i.e., width direction) to the extending direction of the light source substrate 88 (long sides of the rectangular shape), and FIG. 5C being a plan view for explaining a lighting status of the light emitting elements 89.

As shown in FIGS. 3 to 5C, the lighting device 8 includes the light guide plate 80 disposed to overlap the lower side of the display panel 10, and the plurality of light emitting elements 89 aligned along the light-receiving surface 80a in a direction from an end portion (X-1 side in the X-axis direction) toward the other end portion thereof (X-2 side in the X-axis direction) with the respective light-emitting surfaces 89a of the light emitting elements 89 arranged so as to oppose the light-receiving surface 80a of the light guide plate 80. In other words, the light emitting elements 89 are aligned in the direction in which the light-receiving surface 80a of the light guide plate 80 extends, so as to oppose the light-receiving surface 80a. In this embodiment, the light emitting elements 89 are mounted on the first surface 881 of the light source substrate 88 extending along the light-receiving surface 80a in the X-axis direction. The light emitting elements 89 are each constituted of a light emitting diode (LED) serving as the light source that emits white light.

In the lighting device 8 according to this embodiment, two sides 801, 803 out of the sides 801, 802, 803, 804 of the light guide plate 80, opposing each other in the Y-axis direction, are utilized as the light-receiving surface 80a. Thus, the plurality of light emitting elements 89 are aligned in a row along each of the two light-receiving surfaces 80a (sides 801, 803) of the light guide plate 80 in a direction from an end portion toward the other end portion thereof, with the respective light-emitting surfaces 89a arranged so as to oppose the light-receiving surface 80a. The light source substrate 88 located so as to oppose each of the two light-receiving surfaces 80a (side 801, 803) is formed in a rectangular shape extending in the direction in which each of the light-receiving surfaces 80a (side 801, 803) extends, and the light emitting elements 89 are mounted on the first surface 881 of each light source substrate 88. A connector 87 is provided at an end portion of the one of the first surface 881 of the light source substrate 88 corresponding to a corner portion of the light guide plate 80 (corner portion of the display panel 10), so as to supply a driving current therethrough to the light emitting elements 89 via the light source substrate 88.

In this embodiment, the light guide plate 80 is formed of a transmissive resin such as an acrylic resin or a polycarbonate resin. A reflecting sheet 187 is interposed between the lower face 80c of the light guide plate 80 and the bottom plate 45 of the lower frame 40, and the optical sheets including the diffusion sheet 182 and the pair of prism sheets 183, 184 are interposed in layers between the upper face (light emitting surface 80b) of the light guide plate 80 and the display panel 10. In this embodiment, the two prism sheets 183, 184 are oriented such that the respective ridgelines thereof are orthogonal to each other. Accordingly, the illuminating light emitted from the light-emitting surface 80b of the light guide plate 80 is diffused in all directions by the diffusion sheet 182, and then acquires a directionality that outputs a peak luminance in a forward direction of the display panel 10, through the pair of prism sheets 183, 184. In this embodiment, fine recessed grooves formed by laser processing and scattering patterns formed of a printed layer of a diffuser are provided on the surface of the light guide plate 80 opposing the reflecting sheet 187, such that the density of the scattering pattern becomes higher at a position more distant from the light emitting element 89. Accordingly, the intensity distribution (luminance distribution) of the illuminating light from the light guide plate 80 becomes uniform irrespective of the distance from the light emitting element 89. In this embodiment, the fine recessed grooves 80e formed on the lower face 80c of the light guide plate 80 serve as the scattering pattern.

The bottom plate 45 of the lower frame 40 is bent downward so as to form a stepped portion that provides a gap between the lower face 80c of the light guide plate 80 and the lower frame 40, in a region opposing the portion of the light guide plate 80 corresponding to the sides 801, 803 each serving as the light-receiving surfaces 80a. The gap allows the reflecting sheet 187 and a base plate 61 of a light source support member 60 to be interposed between the lower face 80c of the light guide plate 80 and the bottom plate 45. In addition, the stepped portion of the bottom plate 45 of the lower frame 40 provides a recess on the rear face of the lower frame 40, so that the flexible interconnect substrate 200 can be bent so as to reach the lower face (rear face) of the bottom plate 45 of the lower frame 40 and the circuit board 250 connected to the flexible interconnect substrate 200 can be located inside the recess within the depth thereof. Such a configuration contributes to reducing the thickness of the lighting device 8.

In this embodiment, the light source substrate 88 is located such that the first surface 881, on which the light emitting elements 89 are mounted, opposes the light-receiving surface 80a of the light guide plate 80. In addition, the light source substrate 88 includes a metal plate 887 extending along the light-receiving surface 80a, and an interconnect pattern and a land, as well as an insulation layer are provided on the surface of the metal plate 887 on the side of the first surface 881. Such a structure can be achieved by, for example, attaching a flexible interconnect substrate 888 including a resin base layer, the interconnect pattern, and an insulating cover layer stacked in this order to the surface of the metal plate 887 on the side of the first surface 881. Thus, electrical insulation is secured between the metal plate 887 and the land on which the interconnect pattern the chip of the light emitting elements 89 are mounted. In this embodiment, the metal plate 887 is formed of an aluminum plate, and serves to secure mechanical strength of the light source substrate 88 and also serves as a heat dissipation plate for releasing the heat generated from the light emitting elements 89.

On a second surface 882 of the respective light source substrates 88, the light source support member 60 is provided so as to retain the light source substrate 88, and the light source support member 60 is retained between the lower frame 40 and the resin frame 30. In this embodiment, the light source support member 60 is a bar-shaped metal material located so as to extend along the second surface 882 of the light source substrate 88, and includes the base plate 61 stacked on the bottom plate 45 of the lower frame 40 and a supporting plate 62 erected upward from halfway of the base plate 61 in the width direction. The supporting plate 62 includes an abutment surface 620, which is disposed in close contact with the entire region of the second surface 882. The light source support member 60 also includes a top plate 63 bent from the upper edge of the supporting plate 62 (opposite the base plate 61) in the direction opposite the light guide plate 80, and the top plate 63 is fixed to at least one of the top plate 55 of the upper frame 50 and the top plate of the resin frame 30, with screws or the like.

In the thus-configured light source support member 60, the surface of the supporting plate 62 on the side of the light guide plate 80 serves as the abutment surface 620 that makes a plane-to-plane contact with the light source substrate 88 so as to support the same, and the light source substrate 88 is attached to the abutment surface 620 as described hereunder.

Fixing Structure of Light Source Substrate 88

As shown in FIGS. 5A and 5B, the plurality of light emitting elements 89 are mounted on the first surface 881 of the light source substrate 88 in the longitudinal direction thereof. In this embodiment, all the light emitting elements 89 are located at regular intervals. To perform the local dimming with the thus-configured lighting device 8, the light emitting elements 89 are divided into a plurality of unit blocks G (blocks Ga, Gb, Gc, . . . ) each including a predetermined number of light emitting elements located adjacent to each other in the longitudinal direction of the light source substrate 88, and the light source driver 280 described earlier referring to FIG. 1B controls the light intensity (emission luminance) with respect to each of the blocks G. FIG. 5C illustrates a state in which the light emitting elements 89 belonging to the blocks Ga, Gc are turned on and the light emitting elements 89 belonging to the blocks Gb, Gd are turned off. Since all the light emitting elements 89 are located at regular intervals in this embodiment, the light emitting elements 89 in the same block are also located at regular intervals. Accordingly, when the light source emits the illuminating light through the light emitting elements 89 of the same block G, the illuminating light presents uniform light intensity distribution (emission luminance distribution).

In this embodiment, the light source substrate 88 is disposed such that the second surface 882 makes a plane-to-plane contact with the abutment surface 620 of the light source support member 60, and the light source substrate 88 thus disposed is positioned with respect to the light source support member 60 and fixed thereto, with the metal screws 86 exemplifying the positioning structure. The light source support member 60 is formed of a metal such as aluminum or an iron-based metal, and disposed in contact with the metal plate 887 of the light source substrate 88. Accordingly, the heat generated from the light emitting element 89 is conducted to the light source support member 60 through the metal plate 887 of the light source substrate 88, and the heat of the light source support member 60 is conducted to the lower frame 40 and then released. Such a configuration suppresses the increase in temperature of the light emitting element 89.

The screws 86 are fastened from the side of the first surface 881 of the light source substrate 88 toward the abutment surface 620 of the light source support member 60, and the head of the screw 86 is exposed on the first surface 881 of the light source substrate 88. In addition, the screws 86 are each located between adjacent ones of the plurality of blocks G (block Ga, Gb, Gc . . . ) of the light emitting elements 89.

More specifically, an orifice 885 slightly larger in diameter than the shaft portion of the screw 86 is formed in the light source substrate 88 between the adjacent blocks G, and a screw hole 625 is formed in the light source support member 60 at the position corresponding to the orifice 885. In this embodiment, a recess 886 slightly larger in diameter than the head of the screw 86 is formed adjacent to the orifice 885 on the side of the first surface 881 of the light source substrate 88. Accordingly, the head of the screw 86 is accommodated inside the recess 886 without protruding from the first surface 881 of the light source substrate 88. Here, it is not mandatory to provide the screws 86 at all the positions between the adjacent blocks G. In this embodiment, for example, the screws 86 are provided at positions Mab between the block Ga and the block Gb Mbc between the block Gb and the block Gc, but not provided at a position Mcd between the block Gc and the block Gd.

Further, although FIGS. 5A to 5C illustrate the structure around the light source substrate 88 on the Y-1 side of the display device 100 in the Y-axis direction, i.e., the side of the frame plate 31 of the resin frame 30, the same structure is provided on the Y-2 side of the display device 100 in the Y-axis direction, i.e., the side of the frame plate 32 of the resin frame 30.

Advantageous Effects of First Embodiment

As described thus far, in the lighting device 8 and the display device 100 according to this embodiment, the plurality of light emitting elements 89 are mounted on the first surface 881 of the light source substrate 88, and the light source substrate 88 is supported by the light source support member 60 located on the side of the second surface 882, by means of the metal screws 86 corresponding to the positioning structure. The plurality of light emitting elements 89 are divided into the plurality of blocks G, and the light source driver 280 switches the amount of light to be emitted with respect to each block G in accordance with the regional brightness level of the image displayed on the display panel 10, so as to control the intensity of the illuminating light with respect to each region thereby achieving a performance expected from the plate-shaped lighting device 8. Here, the conditions of a portion of the first surface 881 of the light source substrate 88 where the screw 86 is located are different from those of the remaining portions since at least a part (head) of the screw 86 is exposed on the first surface 881 of the light source substrate 88. However, since the screw 86 is located between the adjacent blocks G, although the emission status of the illuminating light (diffusion status and reflection status) becomes partially discontinuous owing to the presence of the screw 86, such a discontinuous portion is located between the regions with respect to which the intensity of the illuminating light from the lighting device 8 is respectively controlled through the local dimming process. Consequently, even though the illuminating light intensity becomes partially discontinuous owing to the presence of the screw 86, degradation of display quality originating from such discontinuity can be suppressed.

Second Embodiment

Figure 6:
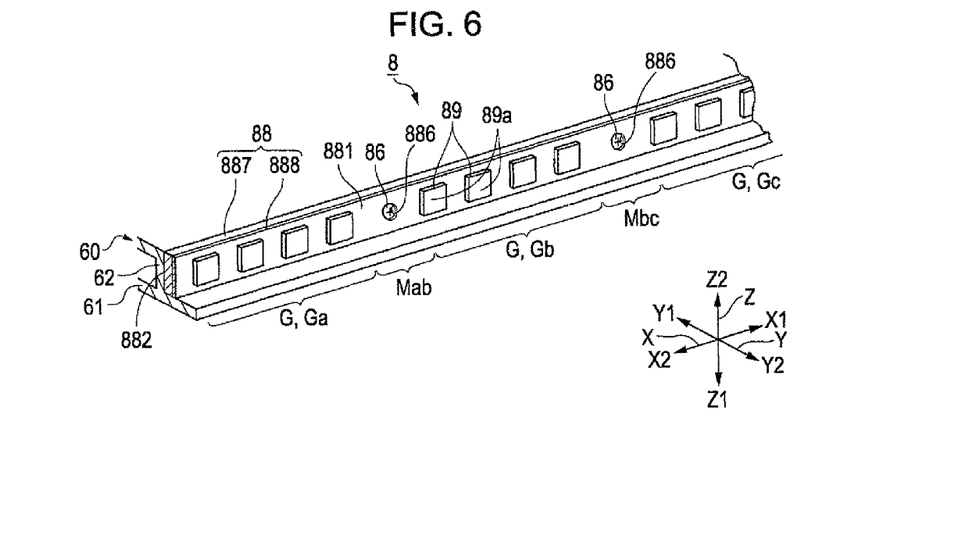
FIG. 6 is a perspective view showing a configuration of light emitting elements and a light source substrate employed in a lighting device of a display device according to a second embodiment of the invention.

FIG. 6 is a perspective view showing a configuration of the light emitting elements 89 and the light source substrate 88 employed in the lighting device 8 of the display device 100, according to a second embodiment of the invention. The basic configuration of this embodiment is similar to that of the first embodiment, and therefore the same constituents will be given the same numeral and the description thereof will not be repeated.

In this embodiment also, as shown in FIG. 6, the plurality of light emitting elements 89 are mounted on the first surface 881 of the light source substrate 88 in the longitudinal direction thereof, as in the first embodiment. In addition, to perform the local dimming with the lighting device 8, the light emitting elements 89 are also divided into a plurality of unit blocks G (blocks Ga, Gb, Gc, . . . ) each including a predetermined number of light emitting elements located adjacent to each other in the longitudinal direction of the light source substrate 88 as in the first embodiment, and the light source driver 280 described earlier referring to FIG. 1B controls the light intensity (emission luminance) with respect to each of the blocks G.

Here, all the light emitting element 89 are located at regular intervals in the first embodiment. In this embodiment, however, although the light emitting elements 89 of the same block G are located at regular intervals, an interval between adjacent light emitting elements 89 respectively belonging to one of adjacent blocks G is different from the interval between the light emitting elements of the same block G. In this embodiment, the interval between adjacent light emitting elements 89 respectively belonging to one of adjacent blocks G is wider than the interval between the light emitting elements of the same block G.

To fix the light source substrate 88 to the light source support member 60 with the screws 86 in the thus-configured lighting device 8, the screws 86 are fastened from the side of the first surface 881 of the light source substrate 88, and the head of each screw 86 is exposed in the recess 886 formed on the first surface 881 of the light source substrate 88. Here, the screws 86 are located between the adjacent ones of the plurality of blocks G (block Ga, Gb, Gc . . . ) of the light emitting elements 89. More specifically, the screws 86 are located at the positions Mab, Mbc between the adjacent blocks G on the light source substrate 88. Accordingly, a part of the light emitted from the light emitting element 89 adjacent to the screw 86 located at a generally central position of the wider interval is reflected by the surface (metal surface) of the screw 86, as if a virtual light source that outputs light of low luminance (low emission intensity) were provided in the wider interval, which partially compensates the discontinuity. In addition, as in the first embodiment, although the intensity of the illuminating light becomes partially discontinuous owing to the presence of the screw 86, such a discontinuous portion is located between the regions with respect to which the intensity of the illuminating light from the lighting device 8 is respectively controlled through the local dimming process. Consequently, even though the illuminating light intensity becomes partially discontinuous owing to the presence of the screw 86, degradation of display quality originating from such discontinuity can be suppressed.

Third Embodiment

Figure 7:
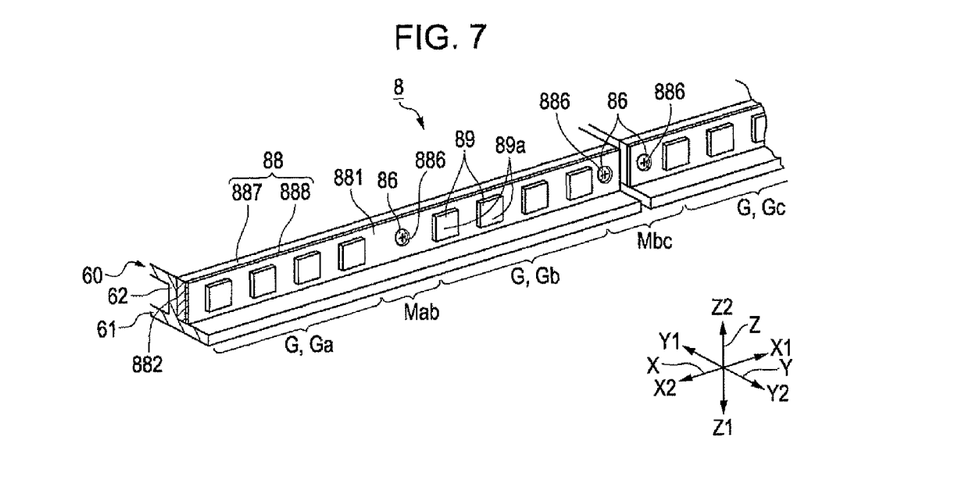
FIG. 7 is a perspective view showing a configuration of light emitting elements and a light source substrate employed in a lighting device of a display device according to a third embodiment of the invention.

FIG. 7 is a perspective view showing a configuration of the light emitting elements 89 and the light source substrate 88 employed in the lighting device 8 of the display device 100, according to a third embodiment of the invention. The basic configuration of this embodiment is similar to that of the first and the second embodiment, and therefore the same constituents will be given the same numeral and the description thereof will not be repeated.

In this embodiment also, as shown in FIG. 7, the plurality of light emitting elements 89 are mounted on the first surface 881 of the light source substrate 88 in the longitudinal direction thereof, as in the first and the second embodiment. In addition, to perform the local dimming with the lighting device 8, the light emitting elements 89 are also divided into a plurality of unit blocks G (blocks Ga, Gb, Gc, . . . ) each including a predetermined number of light emitting elements located adjacent to each other, in the longitudinal direction of the light source substrate 88 as in the first embodiment, and the light source driver 280 described earlier referring to FIG. 1B controls the light intensity (emission luminance) with respect to each of the blocks G. Here, the interval between adjacent light emitting elements 89 respectively belonging to one of adjacent blocks G is wider than the interval between the light emitting elements of the same block G, as in the second embodiment.

Although the light source substrate 88 us integrally formed so as to extend in the longitudinal direction in the first and the second embodiment, the light source substrate 88 is divided at the position Mbc between the adjacent blocks G, in this embodiment. In large-sized TV monitors, a plurality of light source substrates 88 may be provided in the X-axis direction, i.e., the direction of the long sides of the TV monitor, along the light-receiving surface 80a of the light guide plate 80. In this case, the gap between the adjacent light source substrates 88 is determined such that the interval between the unit blocks G of the respective light source substrates 88 becomes equal to the interval between the unit blocks G of the same light source substrate 88, with respect to which the light emission is respectively controlled. With such a configuration also, the screws 86 are fastened from the side of the first surface 881 of the light source substrate 88 to fix the light source substrate 88 to the light source support member 60, and the head of each screw 86 is exposed in the recess 886 formed on the first surface 881 of the light source substrate 88. The screws 86 are located between the adjacent ones of the plurality of blocks G (block Ga, Gb, Gc . . . ) of the light emitting elements 89. More specifically, the screws 86 are located at the positions Mab, Mbc between the adjacent blocks G on the light source substrate 88. Accordingly, a part of the light emitted from the respective light emitting elements 89 adjacent to the two screws 86 located close to the respective end portions of the adjacent light source substrates 88 is reflected by the surface (metal surface) of the screw 86, as if two virtual light sources that output light of low luminance (low emission intensity) were provided in the wider interval, which partially compensates the discontinuity. In addition, as in the first embodiment, although the intensity of the illuminating light becomes partially discontinuous owing to the presence of the screw 86, such a discontinuous portion is located between the regions with respect to which the intensity of the illuminating light from the lighting device 8 is respectively controlled through the local dimming process. Consequently, even though the illuminating light intensity becomes partially discontinuous owing to the presence of the screw 86, degradation of display quality originating from such discontinuity can be suppressed.

The light source substrate 88 is divided at the position Mbc between the adjacent blocks G, in this embodiment. Accordingly, although the intensity of the illuminating light becomes partially discontinuous owing to the divided structure of the light source substrate 88, such a discontinuous portion is located between the regions with respect to which the intensity of the illuminating light from the lighting device 8 is respectively controlled through the local dimming process. Consequently, even though the illuminating light intensity becomes partially discontinuous owing to the divided structure of the light source substrate 88, degradation of display quality originating from such discontinuity can be suppressed.

Fourth Embodiment

Figure 8:
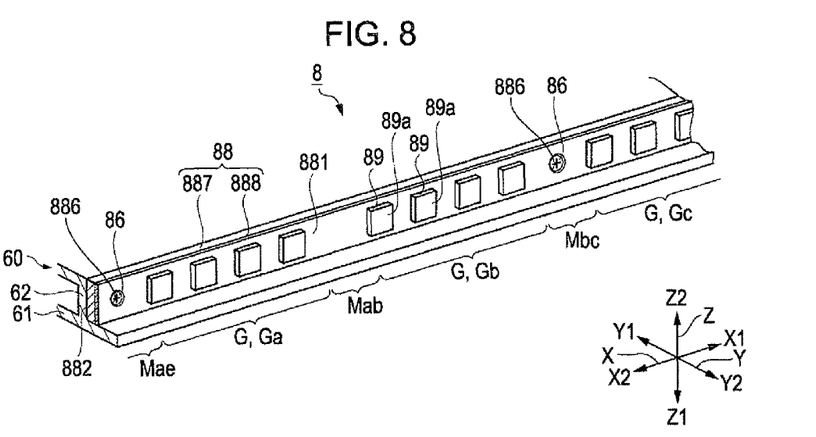
FIG. 8 is a perspective view showing a configuration of light emitting elements and a light source substrate employed in a lighting device of a display device according to a fourth embodiment of the invention.

FIG. 8 is a perspective view showing a configuration of the light emitting elements 89 and the light source substrate 88 employed in the lighting device 8 of the display device 100, according to a fourth embodiment of the invention. The basic configuration of this embodiment is similar to that of the first to the third embodiments, and therefore the same constituents will be given the same numeral and the description thereof will not be repeated.

In this embodiment also, as shown in FIG. 8, the plurality of light emitting elements 89 are mounted on the first surface 881 of the light source substrate 88 in the longitudinal direction thereof, as in the first to the third embodiments. In addition, to perform the local dimming with the lighting device 8, the light emitting elements 89 are also divided into a plurality of unit blocks G (blocks Ga, Gb, Gc, . . . ) each including a predetermined number of light emitting elements located adjacent to each other, in the longitudinal direction of the light source substrate 88 as in the first embodiment, and the light source driver 280 described earlier referring to FIG. 1B controls the light intensity (emission luminance) with respect to each of the blocks G.

In the fourth embodiment, although the light emitting elements 89 of the same block G are located at regular intervals, an interval between adjacent light emitting elements 89 respectively belonging to one of adjacent blocks G is different from the interval between the light emitting elements of the same block G, as in the second and the third embodiment. In this embodiment, the interval between adjacent light emitting elements 89 respectively belonging to one of adjacent blocks G is wider than the interval between the light emitting elements of the same block G, as in the second embodiment.

In addition, a region for fastening the screw 86 is provided between an end portion of the light source substrate 88 and the block Ga. Such a region will be denoted as Mae between the end portion and the block Ga.

To fix the light source substrate 88 to the light source support member 60 with the screws 86 in the thus-configured lighting device 8, the screws 86 are fastened from the side of the first surface 881 of the light source substrate 88, and the head of each screw 86 is exposed in the recess 886 formed on the first surface 881 of the light source substrate 88.

In this embodiment, each of the screws 86 is located between a pair of the plurality of blocks G. Specifically, for example, the screw 86 is provided at the positions Mae between the end portion and the block Ga and Mbc between the block Gb and the block Gc. In other words, the screw 86 is not provided at the position Mab between the block Ga and the block Gb.

With such a configuration also, as in the first embodiment, although the intensity of the illuminating light becomes partially discontinuous owing to the presence of the screw 86, such a discontinuous portion is located between the regions (by blocks) with respect to which the intensity of the illuminating light from the lighting device 8 is respectively controlled through the local dimming process. Consequently, even though the illuminating light intensity becomes partially discontinuous owing to the presence of the screw 86, degradation of display quality originating from such discontinuity can be suppressed.

Further, a part of the light emitted from the light emitting element 89 adjacent to each of the screws 86 located at regular intervals is reflected by the surface (metal surface) of the screw 86, as if a virtual light source that outputs light of low luminance (low emission intensity) were provided in the wider interval, which partially compensates the discontinuity.

Fifth Embodiment

Figure 9:
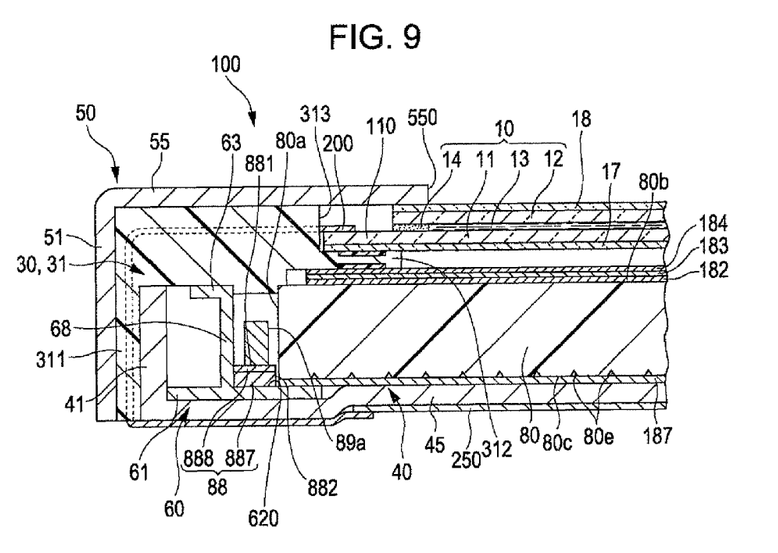
FIG. 9 is a cross-sectional view showing an essential portion of a display device according to a fifth embodiment of the invention.

FIG. 9 is a cross-sectional view showing an essential portion of the display device 100 according to a fifth embodiment of the invention. The basic configuration of this embodiment is similar to that of the first and the second embodiment, and therefore the same constituents will be given the same numeral and the description thereof will not be repeated.

In the foregoing embodiments, the first surface 881 of the light source substrate 88 on which the light emitting elements 89 are mounted is oriented so as to oppose the light-receiving surface 80a of the light guide plate 80. In this embodiment, as shown in FIG. 9, the first surface 881 of the light source substrate 88 on which the light emitting elements 89 are mounted is oriented at 90° with respect to the light-receiving surface 80a of the light guide plate 80. However, the light-emitting surface 89a of each light emitting element 89 is disposed parallel to the light-receiving surface 80a of the light guide plate 80. Accordingly, the light emitting element 89 can emit the light into the light guide plate 80 through the light-receiving surface 80a. In this embodiment, a part of the base plate 61 of the light source support member 60 serves as the abutment surface 620, which is also oriented at 90° with respect to the light-receiving surface 80a of the light guide plate 80. In addition, in the light source support member 60, a vertical plate 68 vertically erected from the base plate 61 is disposed so as to oppose the light-receiving surface 80a of the light guide plate 80.

To fix the light source substrate 88 to the light source support member 60 with the screws 86 in the thus-configured lighting device 8, the screws 86 are fastened from the side of the first surface 881 of the light source substrate 88 at positions between the adjacent blocks G as in the first embodiment. Accordingly, as in the first embodiment, although the intensity of the illuminating light becomes partially discontinuous owing to the presence of the screw 86, such a discontinuous portion is located between the regions with respect to which the intensity of the illuminating light from the lighting device 8 is respectively controlled through the local dimming process. Consequently, even though the illuminating light intensity becomes partially discontinuous owing to the presence of the screw 86, degradation of display quality originating from such discontinuity can be suppressed.

Additional Embodiments

Although the screw 86 is employed as the positioning structure that fixes the light source substrate 88 in position to the light source support member 60 in the foregoing embodiments, the positioning structure may be a hook formed so as to retain the light source substrate 88, or a projection formed on the light source support member 60 to be fitted in a recess formed on the light source substrate 88.

Although the plurality of light emitting elements 89 are aligned in the extending direction of the scanning lines (X-axis direction) in the foregoing embodiments, the light emitting elements 89 may be aligned in the extending direction of the data lines (Y-axis direction), in the display device 100. Such a configuration equally allows the local dimming to be performed, and also allows a scan backlight process to be performed, which includes emitting the illuminating light from the lighting device 8 in accordance with the shifting action of the pixel rows selected by the scanning signal.

Although the screws 86 are located between pairs of the blocks G in the fourth embodiment, the screws may be provided between triplets of the blocks G.

With such a configuration also, as in the first embodiment, although the intensity of the illuminating light becomes partially discontinuous owing to the presence of the screw 86, such a discontinuous portion is located between the regions (by blocks) with respect to which the intensity of the illuminating light from the lighting device 8 is respectively controlled through the local dimming process. Consequently, even though the illuminating light intensity becomes partially discontinuous owing to the presence of the screw 86, degradation of display quality originating from such discontinuity can be suppressed.

Further, a part of the light emitted from the light emitting element 89 adjacent to each of the screws 86 located at regular intervals is reflected by the surface (metal surface) of the screw 86, as if a virtual light source that outputs light of low luminance (low emission intensity) were provided in the wider interval, which partially compensates the discontinuity.

Although the electronic apparatus 2000 incorporated with the display device 100 is exemplified by the liquid crystal TV in the foregoing embodiments, the display device 100 according to the invention may also be incorporated in a display panel of a personal computer, a digital signage, an electronic apparatus such as a car navigation system or a mobile communication terminal, and so forth.

The entire disclosure of Japanese Patent Application No.: 2011-152738, filed Jul. 11, 2011, 2011-263437, filed Dec. 1, 2011, and 2011-263438, filed Dec. 1, 2011 are expressly incorporated by reference herein.

What is claimed is:

1. A display device, comprising:
a lighting device; and
a display panel disposed to overlap a light-emitting surface of the lighting device,
wherein the lighting device includes:
a light guide plate disposed to overlap the display panel;
a plurality of light emitting elements aligned along a first side of the light guide plate in a direction from an end portion toward the other end portion thereof, with a light-emitting surface of each of the plurality of light emitting elements arranged so as to oppose the first side, the first side serving as a light-receiving surface;
a light source driver that controls the plurality of light-emitting elements with respect to each of a plurality of blocks of the light-emitting elements;
a light source substrate having the plurality of light emitting elements mounted on a first surface thereof;
a light source support member attached to a second surface of the light source substrate; and
a positioning structure located between adjacent ones of the plurality of blocks so as to place the light source substrate in position on the light source support member, with at least a part of the positioning structure exposed on the first surface of the light source substrate,
wherein the plurality of light emitting elements are divided into a plurality of blocks in the direction from an end portion toward the other end portion of the first side, and the light source driver controls an amount of light to be emitted from each of the blocks, in accordance with a mode in which the display panel is driven.

2. The display device according to claim 1,
wherein the positioning structure is a screw fastened from the side of the first surface of the light source substrate.

3. The display device according to claim 1,
wherein the light emitting elements are aligned at regular intervals along the first side, in each of the blocks.

4. The display device according to claim 3,
wherein the plurality of light emitting elements are aligned at regular intervals along the first side.

5. The display device according to claim 3,
wherein intervals between the light emitting elements in the same block are different from an interval between adjacent light emitting elements respectively belonging to one of adjacent ones of the plurality of blocks.

6. The display device according to claim 1,
wherein the light source substrate is integrally formed so as to extend in the direction from an end portion toward the other end portion of the light guide plate.

7. The display device according to claim 1,
wherein the light source substrate is divided at a position between adjacent ones of the plurality of blocks.

8. An electronic apparatus comprising the display device according to claim 1.

9. A lighting device, comprising:
a light guide plate;
a plurality of light emitting elements aligned along a first side of the light guide plate in a direction from an end portion toward the other end portion thereof, with a light-emitting surface of each of the plurality of light emitting elements arranged so as to oppose the first side, the first side serving as a light-receiving surface;
a light source driver that controls the plurality of light-emitting elements with respect to each of a plurality of blocks of the light-emitting elements;
a light source substrate having the plurality of light emitting elements mounted on a first surface thereof;
a light source support member attached to a second surface of the light source substrate; and
a positioning structure located between adjacent ones of the plurality of blocks so as to place the light source substrate in position on the light source support member, with at least a part of the positioning structure exposed on the first surface of the light source substrate,
wherein the plurality of light emitting elements are divided into a plurality of blocks in the direction from the end portion toward the other end portion of the first side, and the light source driver controls an amount of light to be emitted from each of the blocks, in accordance with a mode in which an associated display panel is driven.

10. A display device, comprising:
a lighting device; and
a display panel disposed to overlap a light-emitting surface of the lighting device,
wherein the lighting device includes:
a light guide plate disposed to overlap the display panel;
a plurality of light emitting elements aligned along a first side of the light guide plate in a direction from an end portion toward the other end portion thereof, with a light-emitting surface of each of the plurality of light emitting elements arranged so as to oppose the first side, the first side serving as a light-receiving surface;
a light source driver that controls the plurality of light-emitting elements with respect to each of a plurality of blocks of the light-emitting elements;
a light source substrate having the plurality of light emitting elements mounted on a first surface thereof;
a light source support member attached to a second surface of the light source substrate; and
a positioning structure located between adjacent ones of the plurality of blocks so as to place the light source substrate in position on the light source support member, with at least a part of the positioning structure exposed on the first surface of the light source substrate, the positioning structure adapted to be inserted from the first surface of the light source substrate.

11. The display device according to claim 10, wherein the plurality of light emitting elements are divided into a plurality of blocks in the direction from an end portion toward the other end portion of the first side, and the light source driver controls an amount of light to be emitted from each of the blocks, in accordance with a mode in which the display panel is driven.

12. The display device according to claim 10,
wherein the light emitting elements are aligned at regular intervals along the first side, in each of the blocks.

13. The display device according to claim 10,
wherein the light source substrate is integrally formed so as to extend in the direction from an end portion toward the other end portion of the light guide plate.

14. The display device according to claim 10,
wherein the light source substrate is divided at a position between adjacent ones of the plurality of blocks.

15. An electronic apparatus comprising the display device according to claim 10.

16. A display device, comprising:
a lighting device; and
a display panel disposed to overlap a light-emitting surface of the lighting device,
wherein the lighting device includes:
a light guide plate disposed to overlap the display panel;
a plurality of light emitting elements aligned along a first side of the light guide plate in a direction from an end portion toward the other end portion thereof, with a light-emitting surface of each of the plurality of light emitting elements arranged so as to oppose the first side, the first side serving as a light-receiving surface;
a luminance distribution detector that detects a brightness of each of a plurality of blocks of the light-emitting elements;
a light source driver that controls, responsive to the detected brightness of each of the plurality of blocks, the plurality of light-emitting elements with respect to each of the plurality of blocks of the light-emitting elements;
a light source substrate having the plurality of light emitting elements mounted on a first surface thereof;
a light source support member attached to a second surface of the light source substrate; and
a positioning structure located between adjacent ones of the plurality of blocks so as to place the light source substrate in position on the light source support member, with at least a part of the positioning structure exposed on the first surface of the light source substrate.

17. The display device according to claim 16, wherein the plurality of light emitting elements are divided into a plurality of blocks in the direction from an end portion toward the other end portion of the first side, and the light source driver controls an amount of light to be emitted from each of the blocks, in accordance with a mode in which the display panel is driven.

18. The display device according to claim 16,
wherein the light emitting elements are aligned at regular intervals along the first side, in each of the blocks.

19. The display device according to claim 16,
wherein the light source substrate is integrally formed so as to extend in the direction from an end portion toward the other end portion of the light guide plate.

20. An electronic apparatus comprising the display device according to claim 16.

* * * * *